US010329459B2

(12) United States Patent
Choi et al.

(10) Patent No.: US 10,329,459 B2
(45) Date of Patent: Jun. 25, 2019

(54) ADHESIVE COMPOSITION

(71) Applicant: DONGWOO FINE-CHEM CO., LTD., Jeollabuk-do (KR)

(72) Inventors: Han Young Choi, Gyeonggi-do (KR); Ju Yeol Jang, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 144 days.

(21) Appl. No.: 15/121,805

(22) PCT Filed: Feb. 3, 2015

(86) PCT No.: PCT/KR2015/001089
§ 371 (c)(1),
(2) Date: Aug. 26, 2016

(87) PCT Pub. No.: WO2015/130023
PCT Pub. Date: Sep. 3, 2015

(65) Prior Publication Data
US 2017/0015875 A1 Jan. 19, 2017

(30) Foreign Application Priority Data

Feb. 28, 2014 (KR) .................. 10-2014-0023875

(51) Int. Cl.
*C09J 7/38* (2018.01)
*C08K 5/544* (2006.01)
*C09J 11/06* (2006.01)
*C09J 133/04* (2006.01)
*G02B 5/30* (2006.01)
*C08F 220/18* (2006.01)
*C09J 7/00* (2018.01)
*C09J 133/06* (2006.01)
*C08F 265/06* (2006.01)
*C09J 4/06* (2006.01)
*C09J 133/08* (2006.01)
*C09J 7/22* (2018.01)
*C08K 5/5465* (2006.01)

(52) U.S. Cl.
CPC ............ *C09J 11/06* (2013.01); *C08F 220/18* (2013.01); *C08F 265/06* (2013.01); *C09J 4/06* (2013.01); *C09J 7/00* (2013.01); *C09J 7/22* (2018.01); *C09J 7/38* (2018.01); *C09J 133/04* (2013.01); *C09J 133/06* (2013.01); *C09J 133/08* (2013.01); *G02B 5/30* (2013.01); *C08F 2220/1825* (2013.01); *C08F 2500/26* (2013.01); *C08F 2800/20* (2013.01); *C08K 5/544* (2013.01); *C08K 5/5442* (2013.01); *C08K 5/5465* (2013.01); *C09J 2203/318* (2013.01); *C09J 2205/102* (2013.01); *C09J 2205/114* (2013.01); *C09J 2433/00* (2013.01); *G02B 5/3033* (2013.01)

(58) Field of Classification Search
CPC .... C08K 5/544; C08K 5/5442; C08K 5/5455; C08K 5/5465; C09J 11/06; C09J 133/06; C09J 133/08; C09J 2433/00
See application file for complete search history.

(56) References Cited

U.S. PATENT DOCUMENTS

| | | | | |
|---|---|---|---|---|
| 4,732,858 A * | 3/1988 | Brewer | ................. | G03F 7/0751 430/272.1 |
| 4,950,701 A * | 8/1990 | Okamura | ................... | C09J 5/04 524/237 |
| 5,932,320 A * | 8/1999 | Okajima | ................. | B32B 27/36 427/412.1 |
| 7,309,737 B2 * | 12/2007 | Kim | ................... | C08G 18/2895 525/100 |
| 8,048,601 B2 * | 11/2011 | Wu | ........................ | G03G 5/102 430/60 |
| 8,742,025 B2 * | 6/2014 | Jung | ........................ | B32B 7/12 428/355 AC |
| 2003/0097014 A1 * | 5/2003 | Gedon | ................. | C07F 7/1836 556/410 |
| 2004/0220306 A1 * | 11/2004 | Kageishi | ............ | C09D 133/068 524/261 |
| 2011/0293933 A1 * | 12/2011 | Jung | ........................ | B32B 7/12 428/355 AC |
| 2016/0130402 A1 * | 5/2016 | Schubert | ................ | C08G 77/26 524/425 |

FOREIGN PATENT DOCUMENTS

| | | | |
|---|---|---|---|
| CN | 101679823 | A | 3/2010 |
| JP | 7-331204 | A | 12/1995 |
| KR | 10-2011-0096985 | A | 8/2011 |
| WO | 97-42200 | A1 | 11/1997 |
| WO | 99-03865 | A1 | 1/1999 |
| WO | 99-03866 | A1 | 1/1999 |

OTHER PUBLICATIONS

Machine Translation of KR-10-2011-0096985 (Year: 2011).*
International Search Report for PCT/KR2015/001089.

* cited by examiner

*Primary Examiner* — Scott R. Walshon
(74) *Attorney, Agent, or Firm* — The PL Law Group, PLLC

(57) ABSTRACT

An adhesive composition includes an acryl copolymer having a carboxyl group, and a silane compound represented by Formula 1 or 2, thereby it is possible to exhibit excellent initial adhesiveness and adhesive durability under severe conditions, and prevent the substrate from being torn due to a decrease in adhesiveness by water applied thereto, and the adhesive from remaining on the substrate during peeling-off the adhesive layer, as well as after drying, the adhesive layer may exhibit favorable adhesiveness again, thus being used for re-bonding.

9 Claims, No Drawings

ADHESIVE COMPOSITION

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2015/001089, filed on Feb. 03, 2015, which claims priority to the benefit of Korean Patent Application No. 10-2014-0023875 filed in the Korean Intellectual Property Office on Feb. 28, 2014, the entire contents of which are incorporated herein by reference.

BACKGROUND OF THE INVENTION

1. Field of the Invention

The present invention relates to an adhesive composition.

2. Description of the Related Art

A liquid crystal display device generally consists of liquid crystal cells and a polarizing plate, mostly includes an adhesive layer formed on one surface of the polarizing plate to bond the liquid crystal cells to the polarizing plate. Otherwise, in order to improve performance of the liquid crystal display device, a phase retardation plate, a wide viewing angle compensation plate, or a luminance-enhancing film is additionally attached to the polarizing plate by an adhesive to be used.

The adhesive used for bonding the liquid crystal cells to the polarizing plate may be exposed to hot and humid environments during manufacturing, transporting or management after the bonding, therefore, it is required that the adhesive has excellent durability in order to maintain desired adhesiveness even under the above-described severe circumstance.

Further, the adhesive must be peeled off and adhered again when misalignment, impurity mingling, etc. occurs during bonding, and if necessary, therefore, must have easily peeling-off and re-bonding, that is, reworking properties.

As the adhesive used in the above-described bonding, an adhesive composition including a silane compound having a hydrocarbon group has been disclosed (Japanese Patent Laid-Open Publication No. H7-331204). However, this adhesive cannot maintain desired adhesiveness to an extent required in an environment in which the adhesive is practically used, as well as, adhesiveness may be increased too much under hot and humid conditions or the adhesive may remain on a substrate during peel-off, and hence causing difficulties in peeling-off and re-bonding.

SUMMARY

An object of the present invention is to provide an adhesive composition having excellent initial adhesiveness and adhesive durability under severe conditions such as hot and humid environments while ensuring re-workability.

The above object of the present invention will be achieved by the following characteristics:

(1) An adhesive composition, including: an acryl copolymer having a carboxyl group, and a silane compound represented by Formula 1 or 2 below:

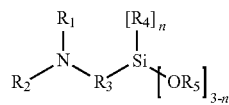

[Formula 1]

(wherein $R_1$ and $R_2$ are each independently alkyl group having 1 to 12 carbon atoms or aryl group having 6 to 14 carbon atoms, which may be disconnected by O, S, CO or COO or include unsaturated bonds, or are linked together to form a hydrocarbon ring having 3 to 5 carbon atoms, wherein the ring may include unsaturated bonds or hetero atom;

$R_3$ is an alkylene group having 1 to 12 carbon atoms which may be disconnected by O, S, CO or COO;

$R_4$ and $R_5$ are each independently alkyl group having 1 to 6 carbon atoms; and n is an integer ranging from 0 to 2).

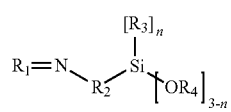

[Formula 2]

(wherein $R_1$ is an alkanylidene group having 1 to 10 carbon atoms which may be disconnected by O, S, CO or COO;

$R_2$ is an alkylene group having 1 to 12 carbon atoms which may be disconnected by O, S, CO or COO;

$R_3$ and $R_4$ are each independently alkyl group having 1 to 6 carbon atoms; and n is an integer ranging from 0 to 2).

(2) The adhesive composition according to the above (1), the acryl copolymer is polymerized by including 1 wt. % or more of an ethylenically unsaturated monomer having a carboxyl group to a total weight of the overall monomer.

(3) The adhesive composition according to the above (1), the acryl copolymer is polymerized by including 2.5 to 8 wt. % of an ethylenically unsaturated monomer having a carboxyl group to a total weight of the overall monomer.

(4) The adhesive composition according to the above (1), the silane compound is at least one among compounds represented by Formulae 3 to 9 below:

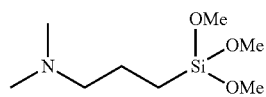

[Formula 3]

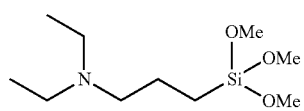

[Formula 4]

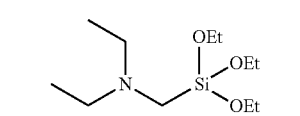

[Formula 5]

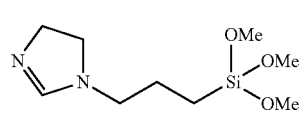

[Formula 6]

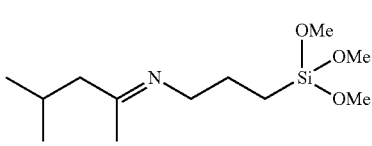

[Formula 7]

-continued

[Formula 8]

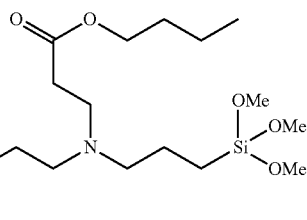

[Formula 9]

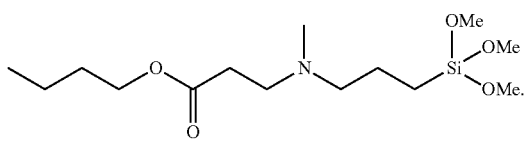

(5) The adhesive composition according to the above (1), the silane compound is included in an amount of 0.01 to 5 wt. parts to 100 wt. parts of the acryl copolymer.

(6) The adhesive composition according to the above (1), further including a cross-linking agent selected from a group consisting of isocyanate, epoxy, metal chelate, oxazoline and poly-functional acrylate-based compounds.

(7) An adhesive sheet including an adhesive layer formed using the adhesive composition according to any one of the above (1) to (6).

(8) A polarizing plate including an adhesive layer formed using the adhesive composition according to any one of the above (1) to (6), on at least one surface of the polarizing plate.

(9) An image display device including the polarizing plate according to the above (8).

An adhesive layer formed using the adhesive composition of the present invention exhibits excellent initial adhesiveness and adhesive durability under severe conditions.

The adhesive layer formed using the adhesive composition of the present invention may prevent the substrate from being torn due to a decrease in adhesiveness by water applied thereto, and the adhesive from remaining on the substrate during peeling-off the adhesive layer. Further, after drying, the adhesive layer exhibits favorable adhesiveness again, thus being used for re-bonding.

DETAILED DESCRIPTION

The present invention discloses an adhesive composition, including: an acryl copolymer having a carboxyl group, and a silane compound represented by Formula 1 or 2, thereby it is possible to exhibit excellent initial adhesiveness and adhesive durability under severe conditions, and prevent the substrate from being torn due to a decrease in adhesiveness by water applied thereto, and the adhesive from remaining on the substrate during peeling-off the adhesive layer, as well as after drying, the adhesive layer may exhibit favorable adhesiveness again, thus being used for re-bonding.

Hereinafter, the present invention will be described in details.

<Adhesive Composition>

An acryl copolymer according to the present invention has a carboxyl group so as to be combined with a silane compound to be described below. This may also be polymerized by including ethylenically unsaturated monomers, thus being introduced.

The ethylenically unsaturated monomer having a carboxyl group is not particularly limited but may include, for example: monocarboxylic acid such as acrylic acid, methacrylic acid, crotonic acid, etc.; dicarboxylic acid such as fumaric acid, methaconic acid itaconic acid, etc. and anhydrides thereof; mono(meth)acrylate of a polymer having carboxyl and hydroxyl groups at both ends thereof such as ω-carboxypolycaprolactone mono(meth)acrylate, etc., and preferably, acrylic acid and methacrylic acid, which are used alone or in combination of two or more thereof.

A content of the ethylenically unsaturated monomer having a carboxyl group is not particularly limited but may be, for example, 1 wt. % or more to a total weight of the monomer to be included in the copolymer. If the content is less than 1 wt. %, the initial adhesiveness and durability may be decreased. The reason of this is considered that bonding between the acryl copolymer and a polar group on the surface of the substrate and a combination of the acryl copolymer with the silane compound to be described below are not sufficient. In an aspect of maximizing adhesiveness and durability with an optimal level of gel fraction, the above unsaturated monomer is preferably included in an amount of 2.5 to 8 wt. %.

The acryl copolymer according to the present invention may be polymerized by further including (meth)acrylate having an alkyl group with 1 to 12 carbon atoms.

Herein, (meth)acrylate means both of acrylate and methacrylate.

(Meth)acrylate monomer having an alkyl group with 1 to 12 carbon atoms may include, for example, n-butyl(meth)acrylate, 2-butyl(meth)acrylate, t-butyl(meth)acrylate, 2-ethylhexyl(meth)acrylate, ethyl(meth)acrylate, methyl(meth)acrylate, n-propyl(meth)acrylate, isopropyl(meth)acrylate, pentyl(meth)acrylate, n-octyl(meth)acrylate, isooctyl(meth)acrylate, nonyl(meth)acrylate, decyl(meth)acrylate, lauryl(meth)acrylate, or the like. Among these, n-butylacrylate, 2-ethylhexylacrylate or a mixture thereof is preferably used. These compound may be used alone or in combination of two or more thereof.

Besides, the acryl copolymer according to the present invention may be polymerized by further including at least one other monomer copolymerizable with the above monomer. For example, aromatic vinyl compounds such as styrene, vinyltoluene, methylstyrene, p-chlorostyrene, o-methoxystyrene, m-methoxystyrene, p-methoxystyrene, o-vinylbenzylmethylether, m-vinylbenzylmethylether, p-vinylbenzylmethylether, o-vinylbenzylglycidylether, m-vinylbenzylglycidylether, p-vinylbenzylglycidylether, etc.; N-substituted maleimide compounds such as N-cyclohexylmaleimide, N-benzylmaleimide, N-phenylmaleimide, N-o-hydroxyphenylmaleimide, N-m-hydroxyphenylmaleimide, N-p-hydroxyphenylmaleimide, N-o-methylphenylmaleimide, N-m-methylphenylmaleimide, N-p-methylphenylmaleimide, N-o-methoxyphenylmaleimide, N-m-methoxyphenylmaleimide, N-p-methoxyphenylmaleimide, etc.; alicyclic (meth)acrylates such as cyclopentyl(meth)acrylate, cyclohexyl (meth)acyrlate, 2-methylcyclohexyl(meth)acrylate, tricyclo [5.2.1.0.2,6]decane-8-yl(meth)acrylate, 2-dicyclophentanyloxyethyl(meth)acrylate, isobornyl(meth)acrylate, etc.; aryl(meth)acrylates such as phenyl(meth)acrylate, benzyl(meth)acrylate, etc.; unsaturated oxetane compounds such as 3-(methacryloyloxymethyl)oxetane, 3-(methacryloyloxymethyl)-3-ethyloxetane, 3-(methacryloyloxymethyl)-2-trifluoromethyloxetane, 3-(methacryloyloxymethyl)-2-phenyloxetane, 2-(methacryloyloxymethyl)oxetane, 2-(methacryloyloxymethyl)-4-trifluoromethyloxetane, etc.; glycidyl(meth)acrylate; (meth)acrylate having a tricyclodecane backbone, or the like. These compounds may be used alone or in combination of two or more thereof.

A method for preparation of copolymers is not particularly limited, but may include bulk polymerization, solution polymerization, emulsion polymerization, or suspension polymerization or the like, which are commonly used in the related art. In particular, solution polymerization is preferably used. Further, solvents, polymerization initiators, chain transfer agents for controlling a molecular weight, or the like, which are generally used in the polymerization, may also be included.

The acryl copolymer may have a weight average molecular weight (in terms of polystyrene, Mw) measured according to gel permeation chromatography (GPC) ranging from 50,000 to 2,000,000, and preferably, 400,000 to 2,000,000. If the weight average molecular weight is less than 50,000, cohesion between copolymers is insufficient to cause a problem in bonding durability. When the weight average molecular weight exceeds 2,000,000, it may need a great amount of diluted solvent in order to ensure desired workability during coating.

The adhesive composition of present invention may include a silane compound represented by Formula 1 or 2 below:

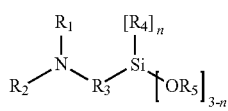

[Formula 1]

(wherein $R_1$ and $R_2$ are each independently alkyl group having 1 to 12 carbon atoms or aryl group having 6 to 14 carbon atoms, which may be disconnected by O, S, CO or COO or include unsaturated bonds, or are linked together to form a hydrocarbon ring having 3 to 5 carbon atoms, wherein the ring may include unsaturated bonds or hetero atom;

$R_3$ is an alkylene group having 1 to 12 carbon atoms which may be disconnected by O, S, CO or COO;

$R_4$ and $R_5$ are each independently alkyl group having 1 to 6 carbon atoms; and n is an integer ranging from 0 to 2).

[Formula 2]

(wherein $R_1$ is an alkanylidene group having 1 to 10 carbon atoms which may be disconnected by O, S, CO or COO;

$R_2$ is an alkylene group having 1 to 12 carbon atoms which may be disconnected by O, S, CO or COO;

$R_3$ and $R_4$ are each independently alkyl group having 1 to 6 carbon atoms; and n is an integer ranging from 0 to 2).

The hetero atom may be, for example, N, O, P, S or the like.

Using the silane compound according to the present invention together with an acryl copolymer having a carboxyl group may produce an adhesive composition with excellent adhesive durability and noticeably improved re-workability since adhesiveness is reduced to be easily reworked when the composition contacts water.

The reason of the above fact is considered because an alkoxy group bonded to Si atom in Formulae 1 and 2 is linked with a polar group on the surface of the substrate to be adhered, a tertiary amino group ($NR_3$) is linked with a carboxyl group of the acryl copolymer through hydrogen bonding and/or ionic bonding so as to increase adhesive durability, and such linkage between the tertiary amino group ($NR_3$) and the carboxyl group of the acryl copolymer is easily dissociated by water applied thereto.

The silane compound represented by Formula 1 or 2 is not particularly limited but may include following compounds represented by Formulae 3 to 9. These compounds may be used alone or in combination of two or more thereof.

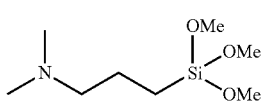

[Formula 3]

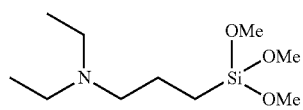

[Formula 4]

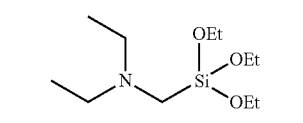

[Formula 5]

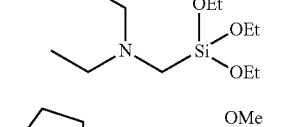

[Formula 6]

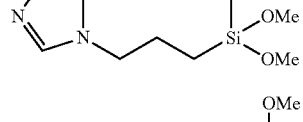

[Formula 7]

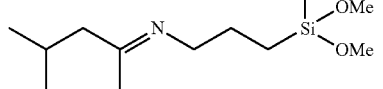

[Formula 8]

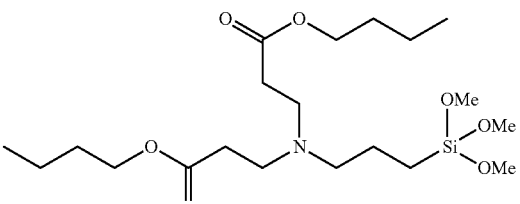

[Formula 9]

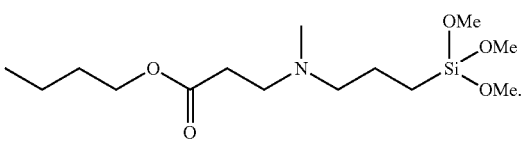

A content of the silane compound according to the present invention is not particularly limited so far as it can fully express functions thereof, for example, may range from 0.01 to 5 wt. parts, and preferably, 0.1 to 5 wt. parts to 100 wt. parts of the acryl copolymer. If the content is less than 0.01 wt. part, improvement in durability and re-workability may be insignificant. When the content exceeds 5 wt. parts, cohesion increases too much and may cause a decrease in adhesive properties such as adhesiveness, hence deteriorating durability.

The adhesive composition of the present invention may further include a cross-linking agent.

The cross-linking agent may further improve adhesiveness and durability, and maintain reliability at a high temperature and a shape of the adhesive.

The cross-linking agent is not particularly limited but may include any conventional cross-linking agent used in the related art. For example, isocyanate, epoxy, metal chelate, poly-functional acrylate or oxazoline-based cross-linking agents, or the like, may be used. In an aspect of improvement in durability, the isocyanate-based cross-linking agents are preferably used. These compounds may be used alone or in combination of two or more thereof.

More particularly, diisocyanate compounds such as tolylene diisocyanate, xylene diisocyanate, hexamethylene diisocyanate, 2,4- or 4,4-diphenylmethane diisocyanate, etc.; and adducts of polyalcohol compounds such as trimethylolpropane of diisocyanate, etc., may be used.

Further, at least one cross-linking agent selected from a group consisting of melamine derivatives, for example, hexamethylol melamine, hexamethoxymethyl melamine, hexabutoxymethyl melamine, etc.; polyepoxy compounds, for example, epoxy compounds in form of bisphenol A and epichlorohydrin condensates; polyglycidylether of polyoxyalkylene polyol, glycerin di- or tri-glycidylether and tetraglycidyl xylenediamine, or the like, may be further added to the above isocyanate-based cross-linking agents and used together.

A content of the cross-linking agent is not particularly limited so far as it can fully express functions thereof but may include, for example, in a range of 0.1 to 15 wt. parts, and preferably, 0.1 to 5 wt. parts to 100 wt. parts of the acryl copolymer. If the content is less than 0.1 wt. parts, cohesion decreases due to lack of cross-linking degree, and may deteriorate physical properties such as adhesive durability and cutting ability. When the content exceeds 15 wt. parts, there may occur a problem in mitigating residual stress due to excess cross-linking reaction.

The adhesive composition of the present invention may further include different additives such as bonding resins, antioxidants, anti-corrosive agents, leveling agents, surface lubricants, defoaming agents, fillers, photo-stabilizers, antistatic agents, or the like, so as to control desired adhesiveness, cohesion, viscosity, elastic modulus, glass transition temperature, or the like, depending upon uses thereof.

The adhesive composition of the present invention may be used as an adhesive for a polarizing plate used for bonding with liquid crystal cells or an adhesive for a surface protective film. Further, the adhesive compositions may be used as, for example, protective films, reflection sheets, adhesive sheets for structures, adhesive sheets for photographs, adhesive sheets for indication of traffic lane, adhesive products for optical use, adhesive for electronic parts, as well as commercially available adhesive sheet products, medical patches, or the like.

<Adhesive Sheet>

Further, the present invention provides an adhesive sheet including an adhesive layer formed using the adhesive composition.

A thickness of the adhesive layer is not particularly limited but, for example, may range from 0.5 to 50 μm.

The adhesive sheet of the present invention may include an adhesive layer formed on at least one surface of a release film.

The adhesive layer may be formed by coating the at least one surface of the release film with the adhesive composition. A coating method is not particularly limited but may include any conventional method known in the related art. For example, bar coater, air knife, gravure, reverse roll, kiss roll, spray, blade, die coater, casting, spin coating, or the like may be employed.

The release film is not particularly limited but may include any conventional release film used in the related art. For example, polyester resin such as polyethylene terephthalate, polybutylene terephthalate, polyethylene naphthalate, polybutylene naphthalate, etc.; polyimide resin; acryl resin; styrene resin such as polystyrene and acrylonitrile-styrene; polycarbonate resin; polylactic acid resin; polyurethane resin; polyolefin resin such as polyethylene, polypropylene, ethylene-propylene copolymer; vinyl resin such as polyvinyl chloride, polyvinylidene chloride, etc.; sulfone resin; polyether-ether ketone resin; allylate resin; or a mixture thereof may be used.

A thickness of the release film is not particularly limited but, for example, may range from 5 to 500 μm, and preferably, 10 to 100 μm.

<Polarizing Plate>

Further, the present invention provides a polarizing plate including an adhesive layer formed using the adhesive composition on at least one surface thereof.

The polarizing plate of the present invention may include a polarizer, a protective film adhered to at least one surface of the polarizer, and an adhesive layer formed using the adhesive composition on the protective film.

The polarizer may be any polarizer known in the related art, and for example, prepared by a process such as swelling, dying, cross-linking, drawing, washing, drying a polyvinyl alcohol film, or the like.

The protective film used herein may be any film so far as the film has excellent properties such as transparency, mechanical strength, thermal stability, moisture-shielding properties, isotropic properties, or the like. In particular, polyester films such as polyethylene terephthalate, polyethylene isophthalate, polybutylene terephthalate, etc.; cellulose films such as diacetylocellulose, triacetylcellulose, etc.; polycarbonate films; acryl films such as polymethyl (meth)acrylate, polyethyl (meth)acrylate, etc.; styrene films such as polystyrene, acrylonitrile-styrene copolymer, etc.; polyolefin film; vinyl chloride films; polyamide films such as nylon, aromatic polyamide, etc.; imide films; sulfone films; polyetherketone films; polyphenylene sulfide films; vinyl alcohol films; vinylidene chloride films; vinyl butyral films; allylate films; polyoxymethylene films; urethane films; epoxy films; silicon films, or the like, may be used. In particular, the cellulose film having a surface saponified using alkali or the like is preferably used among the above compounds, in consideration of polar properties or durability. The protective film may further have the function of an optical layer.

The adhesive layer may be directly applied to the protective film, or formed by attaching an adhesive sheet to the protective film.

<Image Display Device>

Further, the present invention provides an image display device including the above-described polarizing plate.

The polarizing plate of the present invention may be applied in not only any conventional liquid crystal display device but also a variety of image display devices such as an electroluminescent display device, a plasma display device, an electroluminescent emission display device, or the like.

Hereinafter, preferred embodiments will be described to more concretely understand the present invention with reference to examples. However, it will be apparent to those skilled in the related art that such embodiments are provided for illustrative purposes without limitation of appended claims, various modifications and alterations may be possible without departing from the scope and spirit of the present invention, and such modifications and alterations are duly included in the present invention as defined by the appended claims.

PREPARATIVE EXAMPLE 1

Preparation of Acryl Copolymer

A monomer mixture including 85.4 wt. parts of n-butyl acrylate (BA), 7 wt. parts of methyl acrylate (MA), 5 wt. parts of 2-hydroxyethyl acrylate and 2.6 wt. parts of acrylic acid was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,000,000).

Preparative Example 2

Preparation of Acryl Copolymer

A monomer mixture including 90 wt. parts of n-butyl acrylate (BA), 5 wt. parts of methyl acrylate (MA), 4 wt. parts of 2-hydroxyethyl acrylate and 1 wt. part of acrylic acid was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,000,000).

PREPARATIVE EXAMPLE 3

Preparation of Acryl Copolymer

A monomer mixture including 91 wt. parts of n-butyl acrylate (BA), 1 wt. part of 4-hydroxybutyl acrylate and 8 wt. parts of acrylic acid was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,100,000).

PREPARATIVE EXAMPLE 4

Preparation of Acryl Copolymer

A monomer mixture including 93 wt. parts of n-butyl acrylate (BA), 5 wt. parts of methyl acrylate (MA), 1.1 wt. parts of 2-hydroxyethyl acrylate and 0.9 wt. parts of acrylic acid was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,000,000).

PREPARATIVE EXAMPLE 5

Preparation of Acryl Copolymer

A monomer mixture including 85 wt. parts of n-butyl acrylate (BA), 5 wt. parts of methyl acrylate (MA), 1.9 wt. parts of 2-hydroxyethyl acrylate and 8.1 wt. parts of acrylic acid was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,000,000).

PREPARATIVE EXAMPLE 6

Preparation of Acryl Copolymer

A monomer mixture including 93 wt. parts of n-butyl acrylate (BA), 5 wt. parts of methyl acrylate (MA) and 2 wt. parts of 2-hydroxyethyl acrylate was introduced into 1 L reactor equipped with a cooling device for easy control of temperature, in which a nitrogen gas is refluxed. Then, a solvent, that is, 100 wt. parts of ethyl acetate (EAc) was added thereto. Next, after purging the nitrogen gas for 1 hour in order to remove oxygen, the mixture was maintained at 62° C. After homogenizing the mixture, 0.07 wt. parts of a reaction initiator, that is, azobisisobutyronitrile (AIBN) was introduced into the reactor, followed by a reaction for 8 hours to prepare an acryl copolymer (with a weight average molecular weight of about 1,000,000).

SYNTHESIS EXAMPLE 1

Synthesis of Silane Compound B4

1 mole of 3-methylaminopropyltrimethoxysilane (SIM6500.0, manufactured by Gelist Co.) was dissolved in an acetonitrile solvent, 1.1 moles of butyl acrylate was added in the solution, and the solution was agitated at room temperature for 24 hours. Then, residual butyl acrylate and the acetonitrile solvent were removed by distilling under reduced pressure to prepare a compound of B4.

SYNTHESIS EXAMPLE 2

Synthesis of Silane Compound B5

2.2 moles of 3-aminopropyltrimethoxysilane (KBM-903, manufactured by Shinetsu Co.) was dissolved in an acetonitrile solvent, 2.2 moles of butyl acrylate was added in the solution, and the solution was agitated at room temperature for 24 hours. Then, residual butyl acrylate and the acetonitrile solvent were removed by distilling under reduced pressure to prepare a compound of B5.

EXAMPLES AND COMPARATIVE EXAMPLES

Adhesive compositions were prepared by mixing ingredients with various constitutional compositions and contents thereof shown in Table 1 below, then, diluted with water to become a final concentration of 20 wt. % in consideration of coating ability.

TABLE 1

| Section | Acryl copolymer (A) Component | Wt. part | Silane compound (B) Component | Wt. part | Cross-linking agent (C) Component | Wt. part |
|---|---|---|---|---|---|---|
| Example 1 | A-1 | 100 | B-1 | 0.5 | C-1 | 1 |
| Example 2 | A-1 | 100 | B-2 | 0.5 | C-1 | 1 |
| Example 3 | A-1 | 100 | B-3 | 0.5 | C-1 | 1 |
| Example 4 | A-1 | 100 | B-1 | 0.5 | C-2 | 1 |
| Example 5 | A-1 | 100 | B-1 | 0.5 | C-3 | 1 |
| Example 6 | A-1 | 100 | B-2 | 0.5 | C-4 | 1 |
| Example 7 | A-2 | 100 | B-2 | 0.5 | C-1 | 1 |
| Example 8 | A-3 | 100 | B-2 | 0.5 | C-1 | 1 |
| Example 9 | A-1 | 100 | B-4 | 0.5 | C-1 | 1 |
| Example 10 | A-1 | 100 | B-5 | 0.5 | C-1 | 1 |
| Example 11 | A-1 | 100 | B-1 | 3 | C-1 | 1 |
| Example 12 | A-1 | 100 | B-1 | 5 | C-1 | 1 |
| Example 13 | A-1 | 100 | B-1 | 5.2 | C-1 | 1 |
| Example 14 | A-4 | 100 | B-1 | 0.5 | C-1 | 1 |
| Example 15 | A-5 | 100 | B-1 | 0.5 | C-1 | 1 |
| Example 16 | A-1 | 100 | B-1 | 0.005 | C-1 | 1 |
| Comparative Example 1 | A-1 | 100 | B-6 | 0.5 | C-1 | 1 |
| Comparative Example 2 | A-1 | 100 | B-7 | 0.5 | C-1 | 1 |
| Comparative Example 3 | A-4 | 100 | B-6 | 0.5 | C-1 | 1 |
| Comparative Example 4 | A-4 | 100 | B-7 | 0.5 | C-1 | 1 |
| Comparative Example 5 | A-6 | 100 | B-1 | 0.5 | C-1 | 1 |

A-1: acryl copolymer of Preparative Example 1
A-2: acryl copolymer of Preparative Example 2
A-3: acryl copolymer of Preparative Example 3
A-4: acryl copolymer of Preparative Example 4
A-5: acryl copolymer of Preparative Example 5
A-6: acryl compound of Preparative Example 6

B-1: 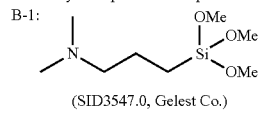
(SID3547.0, Gelest Co.)

B-2: 
(SID3396.0, Gelest Co.)

B-3: 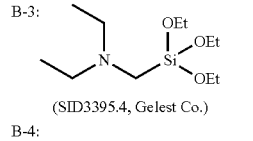
(SID3395.4, Gelest Co.)

B-4:

TABLE 1-continued

| Section | Acryl copolymer (A) Component | Wt. part | Silane compound (B) Component | Wt. part | Cross-linking agent (C) Component | Wt. part |
|---|---|---|---|---|---|---|
| B-5: | | | | | | |

B-6: 3-glycidoxypropyl trimethoxysilane (KBM-403, Shinetsu Co.)
B-7: 3-acetoacetoxypropyl trimethoxysilane (AAPS, Shinetsu Co.)
C-1: TMP adduct of TDI (coronate-L, Japan urethane Co.)
C-2: isocyanurate of HDI (coronate-HXR, Japan urethane Co.)
C-3: TMP adduct of HDI (D110N, Mitsui Chemical Co.)
C-4: TMP adduct of IPDI (D140N, Mitsui Chemical Co.)

EXPERIMENTAL EXAMPLE

Each of the adhesive compositions according to the examples and comparative examples was applied to a release film having a silicon releasing agent coated thereon, such that a thickness after curing becomes 25 μm, followed by drying the same at 100° C. for 1 minute, resulting in an adhesive layer. A release film was laminated on the adhesive layer, thus preparing an adhesive sheet.

After peeling-off the release film from the prepared adhesive sheet, the prepared adhesive layer was laminated on an iodine-based polarizing film having triacetylcellulose-based protective films adhered to both surfaces of the polarizing film (overall thickness of 185 μm) through adhesion processing, thus preparing a polarizing plate. The prepared polarizing plate was stored at 23° C. in a condition of 60% RH during a curing period.

(1) Assessment of Durability

After cutting each of the polarizing plates into a size of 90 mm×170 mm, then peeling-off the release film, the polarizing plate was attached to both surfaces of a glass substrate (110 mm×190 mm×0.7 mm), such that absorption axes of the attached polarizing plates become perpendicular to each other. The attachment was performed in a clean room to prevent generation of foam or impurities while applying a pressure of 5 kg/cm².

Heat resistance of the above laminate was assessed after leaving the same at 80° C. for 1000 hours, then, observing whether bubbles are generated or peel-off occurs. Assessment was performed after leaving the laminate at room temperature for 24 hours, immediately before assessment after the above thermal treatment.

Moisture-heat resistance of the laminate was assessed after leaving the same at 60° C. under a condition of 90% RH humidity for 1000 hours, then, observing whether bubbles are generated or peel-off occurs.

<Standards for Assessment>
◉: bubbling or peeling-off was not observed
○: less than 5 of bubbling or peeling-off
Δ: 5 or more but less than 10 of bubbling or peeling-off
×: 10 or more of bubbling or peeling-off (2) Assessment of Re-Workability After cutting each of the polarizing plates into a size of 25 mm (width) and 100 mm (length), then peeling-off the release film, the polarizing plate was laminated on a glass #1737 purchased from Corning Co. with a pressure of 0.25 MPa, followed by autoclave treatment under conditions of 50° C. and 5 atm for 20 minutes, thus manufacturing a sample for assessment.

After placing the sample in an oven at 80° C. as a heat resistant condition, the heated sample was taken out of the oven after 10 hours and left at room temperature for 120 hours, followed by pulling at a speed of 1.3 cm/s to be peeled off therefrom. Further, the treated sample was placed in another oven under a moisture resistant condition of 60° C. and 90 RH %, taken out of the oven after 12 hours and left at room temperature for 120 hours, followed by pulling at a speed of 1.3 cm/s to be peeled off therefrom.

<Standards for Assessment>

◎: clearly peeled-off without tearing of the polarizing plate and residue of the adhesive on the glass plate.

Δ: residue of the adhesive visibly observed on the surface of the glass plate whereas the polarizing plate was not torn during peeling-off.

x: the polarizing plate was torn during peeling-off.

TABLE 2

| | Durability | | |
|---|---|---|---|
| Section | Heat resistance | Moisture-heat resistance | Re-workability |
| Example 1 | ◎ | ◎ | ○ |
| Example 2 | ◎ | ◎ | ○ |
| Example 3 | ◎ | ◎ | ○ |
| Example 4 | ◎ | ◎ | ○ |
| Example 5 | ◎ | ◎ | ○ |
| Example 6 | ◎ | ◎ | ○ |
| Example 7 | ○ | ◎ | ○ |
| Example 8 | ◎ | ◎ | ○ |
| Example 9 | ◎ | ◎ | ○ |
| Example 10 | ◎ | ◎ | ○ |
| Example 11 | ◎ | ◎ | ○ |
| Example 12 | ◎ | ◎ | ○ |
| Example 13 | ○ | ◎ | ○ |
| Example 14 | ○ | ◎ | ○ |
| Example 15 | ○ | ◎ | ○ |
| Example 16 | ◎ | ○ | ○ |
| Comparative Example 1 | ◎ | ◎ | X |
| Comparative Example 2 | ◎ | ◎ | X |
| Comparative Example 3 | ○ | ◎ | X |
| Comparative Example 4 | ○ | Δ | Δ |
| Comparative Example 5 | X | X | ○ |

Referring to the above Table 2, it can be seen that the polarizing plate having the adhesive layer formed using each of the adhesive compositions according to Examples 1 to 17 had less bubbling or peeling-off even under heat resistant and moisture-heat conditions, to thus exhibit excellent durability. Further, it is easy to peel-off and re-bond the above adhesive layer, thus having excellent re-workability.

However, the polarizing plate having the adhesive layer formed using each of the adhesive compositions according to Comparative Examples 1 to 5 did not have both of excellent durability and re-workability, simultaneously.

What is claimed is:

1. An adhesive composition, comprising:
   an acryl copolymer having a carboxyl group; and
   a silane compound represented by Formula 1 or 2 below:

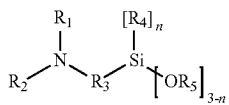

[Formula 1]

wherein $R_1$ and $R_2$ are each independently an alkyl group having 1 to 12 carbon atoms or an aryl group having 6 to 14 carbon atoms, wherein at least one of $R_1$ and $R_2$ is disconnected by O, S, CO or COO, and the alkyl group or the aryl group optionally includes unsaturated bonds;

$R_3$ is an alkylene group having 1 to 12 carbon atoms which is optionally disconnected by O, S, CO or COO;

$R_4$ and $R_5$ are each independently an alkyl group having 1 to 6 carbon atoms; and n is an integer ranging from 0 to 2;

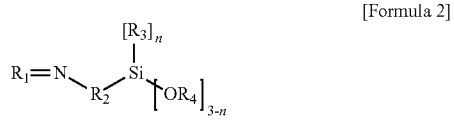

[Formula 2]

wherein $R_1$ is an alkanylidene group having 1 to 10 carbon atoms;

$R_2$ is an alkylene group having 1 to 12 carbon atoms;

at least one of $R_1$ and $R_2$ is disconnected by S, CO or COO;

$R_3$ and $R_4$ are each independently an alkyl group having 1 to 6 carbon atoms; and n is an integer ranging from 0 to 2.

2. The adhesive composition according to claim 1, wherein the acryl copolymer is prepared by polymerizing monomers including 1 wt. % or more of an ethylenically unsaturated monomer having a carboxyl group based on the total weight of the monomers.

3. The adhesive composition according to claim 1, wherein the acryl copolymer is prepared by polymerizing monomers including 2.5 to 8 wt. % of an ethylenically unsaturated monomer having a carboxyl group based on the total weight of the monomers.

4. The adhesive composition according to claim 1, wherein the silane compound is at least one selected from the group consisting of compounds represented by Formulae 8 and 9 below:

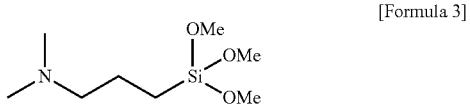

[Formula 3]

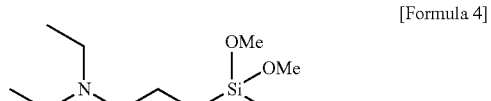

[Formula 4]

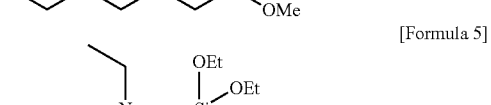

[Formula 5]

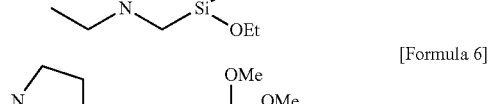

[Formula 6]

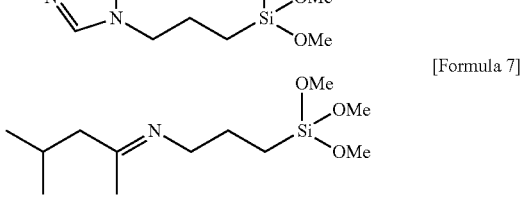

[Formula 7]

-continued

[Formula 8]
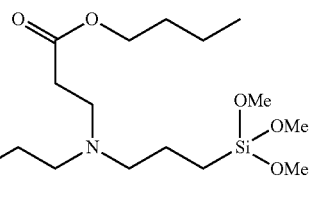

[Formula 9]
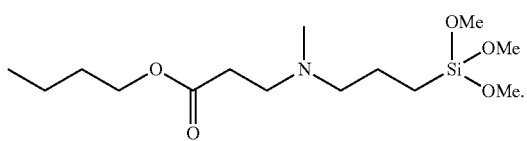

5. The adhesive composition according to claim 1, wherein the silane compound is included in an amount of 0.01 to 5 wt. parts to 100 wt. parts of the acryl copolymer.

6. The adhesive composition according to claim 1, further comprising a cross-linking agent selected from the group consisting of isocyanate, epoxy, metal chelate, oxazoline and poly-functional acrylate-based compounds.

7. An adhesive sheet comprising an adhesive layer formed using the adhesive composition according to claim 1.

8. A polarizing plate comprising an adhesive layer formed using the adhesive composition according to claim 1, on at least one surface of the polarizing plate.

9. An image display device comprising the polarizing plate according to claim 8.

* * * * *